US010348868B2

(12) United States Patent
Ellison et al.

(10) Patent No.: US 10,348,868 B2
(45) Date of Patent: *Jul. 9, 2019

(54) MANAGING NETWORK SOCKETS (71) Applicant: International Business Machines Corporation, Armonk, NY (US)

(72) Inventors: Timothy P. Ellison, Hampshire (GB); Ankur Gupta, Bangalore (IN); Sreedhar B. Kodali, Bangalore (IN); Xiaoqiao Meng, Millwood, NY (US); Neil G. M. Richards, Southampton (GB); Sivasakthi Thirugnanapandi, Dindigul (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/840,082

(22) Filed: Dec. 13, 2017

(65) Prior Publication Data
US 2018/0103125 A1 Apr. 12, 2018

Related U.S. Application Data (63) Continuation of application No. 14/792,691, filed on Jul. 7, 2015, now Pat. No. 9,936,051.

(51) Int. Cl.
*H04L 29/06* (2006.01)
*H04L 12/24* (2006.01)
*G06F 15/173* (2006.01)

(52) U.S. Cl.
CPC ........ *H04L 69/162* (2013.01); *H04L 41/0893* (2013.01)

(58) Field of Classification Search
CPC .......................... H04L 69/162; H04L 41/0893
(Continued)

(56) References Cited

U.S. PATENT DOCUMENTS 6,401,109 B1 6/2002 Heiney et al.
6,519,636 B2 2/2003 Engel
(Continued)

FOREIGN PATENT DOCUMENTS

EP 1385313 A1 7/2003

OTHER PUBLICATIONS

"The Usefulness of Multilevel Hash Tables with Multiple Hash Functions in Large Databases"—Akinwale et al, Dept. of Computer Science, University of Agriculture, Mar. 2009 http://cogprints.org/6536/1/7-1-01-Akinwale.pdf (Year: 2009).*

(Continued)

*Primary Examiner* — Randy A Scott
(74) *Attorney, Agent, or Firm* — Christopher K. McLane (57) ABSTRACT In an approach for managing network sockets, a computer receives a request to create a network socket to transfer data. The computer identifies information associated with the received request, including one or more of: a default network protocol, one or more supported network protocols, ahead of time initialization, a data transfer policy, a failure policy, and a security policy. The computer creates a second level hash map based on the identified information, wherein the second level hash map includes the supported network socket protocols and a connection state. The computer determines a network protocol to utilize associated with the received request. The computer establishes a connection for the network socket over the determined network protocol.

17 Claims, 6 Drawing Sheets (58) Field of Classification Search
USPC .................. 709/203, 218, 224, 226, 229
See application file for complete search history.

(56) References Cited

U.S. PATENT DOCUMENTS

| | | | |
|---|---|---|---|
| 6,820,127 B2* | 11/2004 | Banerjee | H04L 29/06 709/223 |
| 7,478,418 B2 | 1/2009 | Supramaniam et al. | |
| 8,024,417 B2 | 9/2011 | Mehrotra | |
| 8,443,069 B2 | 5/2013 | Bagepalli et al. | |
| 8,483,095 B2 | 7/2013 | Hegde et al. | |
| 8,489,761 B2* | 7/2013 | Pope | H04L 69/16 709/236 |
| 8,839,267 B2 | 9/2014 | Lopez Taboada et al. | |
| 8,935,707 B2 | 1/2015 | Falco et al. | |
| 9,558,132 B2 | 1/2017 | Tamir | |
| 9,563,486 B1* | 2/2017 | Narsude | G06F 17/30569 |
| 9,591,080 B2 | 3/2017 | Zhao et al. | |
| 2001/0051972 A1 | 12/2001 | Eydelman et al. | |
| 2002/0165992 A1 | 11/2002 | Banerjee | |
| 2004/0083308 A1 | 4/2004 | Sebastian et al. | |
| 2012/0166886 A1 | 6/2012 | Shankar et al. | |
| 2012/0239730 A1 | 9/2012 | Revanuru et al. | |
| 2013/0185430 A1* | 7/2013 | Giacomoni | H04L 69/162 709/225 |
| 2013/0191548 A1 | 7/2013 | Boddukuri et al. | |
| 2014/0181527 A1 | 6/2014 | Scolari et al. | |
| 2014/0280666 A1 | 9/2014 | Cardona et al. | |
| 2017/0012844 A1 | 1/2017 | Ellison et al. | |

OTHER PUBLICATIONS

Barreto, Jose, "The basics of SMB Multichannel, a feature of Windows Server 2012 and SMB 3.0", Jun. 28, 2012, A blog by Jose Barreto, a member of the File Server team at Microsoft, 11 pages, <http://blogs.technet.com/b/josebda/archive/2012/06/28/the-basics-of-smb-multichannel-a-feature-of-windows-server-2012-and-smb-3-0.aspx>.
Bestler, Caitlin, "RE: iSCSI over SCTP (RDMA or not)", Mar. 14, 2005, 3 pages, <http://www.spinics.net/lists/iscsi/msg10549.html>.
Feldman, Michael, "RoCE: An Ethernet-InfiniBand Love Story", Apr. 22, 2010, 7 pages, HPCwire, <http://www.hpcwire.com/2010/04/22/roce_an_ethernet_infiniband_love_story/>.
Frey, et al, "Minimizing the Hidden Cost of RDMA", Published in: Distributed Computing Systems, 2009. ICDCS '09. 29th IEEE International Conference, Jun. 22-26, 2009, pp. 553-560.
Herr, et al., "IBM z/Os Shared Memory Communications over RDMA: Performance Considerations", IBM z/Os SMC-R Performance Considerations, Dec. 2013, 31 pages, <http://www.google.co.in/url?sa=t&rct=j&q=&esrc=s&source=web&cd=1&cad=rja&uact=8&ved=0CCkQFjAA&url=http%3A%2F%2Fwww-01.ibm.com%2Fsupport2Fdocview.wss%3Fuid%3Dswg27041273%26aid%3D1&ei=Rm-1U4rlF1708QXtloDYAQ&usg=AFQjCNHh9DscHe0bMgSzfnhYwVxPjPQGoA>.
Jain, Vinit, "A Low-Latency Solution for High-Frequency Trading from IBM and Mellanox," Effective low-cost High-Frequency Trading solutions from IBM and Mellanox, May 2011, 8 pages, <http://www.mellanox.com/pdf/whitepapers/Low-Latency-Solution-for-High-Frequency-Trading-from-IBM-and-Mellanox.pdf>.
Macarthur, et al, "An Efficient Method for Stream Semantics over RDMA", 2014 IEEE 28th International Parallel & Distributed Processing Symposium, May 19-23, 2014, pp. 841-851, <http://ieeexplore.ieee.org/xpl/articleDetails.jsp?arnumber=6877315&navigation=1>.
Thirugnanapandi, et al., "Transparent network acceleration for Java-based workloads in the cloud—Introducing the Java Sockets over RDMA library," Jan. 28, 2014, © 2014 IBM Corporation, 14 pages, <http://www.ibm.com/developerworks/library/j-transparentaccel/>.
Vienne, et al, "Performance Analysis and Evaluation of InfiniBand FDR and 40GigE RoCE on HPC and Cloud Computing Systems", IEEE Hot Interconnects, Aug. 23, 2012, 28 pages.
"TCP Bypass", © Informatix Solutions, 2010, Version 1.6, 40 pages, <http://www.google.co.in/url?sa=t&rct=j&q=&esrc=s&source=web&cd=1&cad=rja&uact=8&ved=0CCkQFjAA&url=http%3A%2F%2Fwww.informatix-sol.com%2Fdocs%2FTCP_bypass.pdf&ei=_22IU_T7BsXk8AXK7oLoBw&usg=AFQjCNHkvxNwsvPv13wFVUcbTL-h2bV95A>.
Appendix P, List of IBM Patents or Patent Applications Treated as Related, 2 pages, dated Jan. 17, 2018.
Ellison et al., "Managing Network Sockets", U.S. Appl. No. 15/840,008, filed Dec. 13, 2017.
Ellison et al., "Managing Network Sockets", U.S. Appl. No. 15/840,263, filed Dec. 13, 2017.
Istvan et al., "A Hash Table for Line-Rate Data Processing", © 2015 ACM, ACM Transactions on Reconfigurable Technology and Systems, vol. 8, No. 2, Article 13, Publication date: Mar. 2015, 15 pages.

* cited by examiner

MANAGING NETWORK SOCKETS

BACKGROUND OF THE INVENTION

The present invention relates generally to the field of inter-process communication across a computer network, and more particularly to creating and managing the storing and retrieving of network socket descriptors to dynamically switch protocols during data communication.

Transmission control protocol (TCP) is a core protocol of the Internet Protocol suite that provides a reliable, point-to-point communication channel between client-server applications on the Internet in order to communicate. To communicate over TCP, a client program and a server program establish a connection to one another through network sockets. A socket is one endpoint of a two-way communication link between two programs running on the network. Sockets are implemented by an application programming interface provided by the operating system that allows application programs to control and use network sockets generally based on the Berkeley sockets standard, which identifies socket API functions, such as create, close, connect, bind, accept, read, and write. Sockets are characterized by at least a local socket address and a transport protocol (e.g., user datagram protocol, TCP, raw sockets) and are bound to a port number so that the TCP layer can identify the applications that data is to be sent to. TCP connections can be uniquely identified by the two endpoints (i.e., unique combination of a port number and Internet Protocol address) and may be capable of allowing multiple connections between the client and the server.

Computer processes that provide application services are servers that create sockets at start up that are in a listen state, waiting for initiatives from client programs. For example, a server operates on a specific computer and binds a socket to a specific port number that the server then monitors for a connection request from a client. The hostname of the specific computer on which the server operates upon and the port number the server monitors are known by the client. Hostnames are human-readable nicknames, such as a domain name, that corresponds to the Internet Protocol address of a device connected to a network. To make a connection request, the client attempts to establish a connection with the server via the monitored port number and identifies a bound local port number associated with the client for use during the connection. Upon acceptance, the server may bind a new socket to the same local port and sets a remote endpoint to the address and port of the client, or the server may bind a new socket to a different port. The server utilizes the new socket in order to continue monitoring the original socket for other connection requests while the server utilizes the established connection to tend to the needs of the connected client. When the connection is accepted, a socket is successfully created, and the client can then use the socket to communicate with the server by writing to or reading from the connected sockets.

SUMMARY

Aspects of the present invention disclose a method, computer program product, and system for managing network sockets. The method includes one or more computer processors receiving a request to create a network socket to transfer data. The method further includes one or more computer processors identifying information associated with the received request, including one or more of: a default network protocol, one or more supported network protocols, ahead of time initialization, a data transfer policy, a failure policy, and a security policy. The method further includes one or more computer processors creating a second level hash map based on the identified information, wherein the second level hash map includes the supported network socket protocols and a connection state. The method further includes one or more computer processors determining a network protocol to utilize associated with the received request. The method further includes one or more computer processors establishing a connection for the network socket over the determined network protocol.

DETAILED DESCRIPTION

Stream sockets are a type of Internet socket that provides connection-oriented, sequenced, and unique flow of data without record boundaries with well-defined mechanisms for creating and destroying connections and for detecting errors. With each socket related call, processing of the stream sockets results in passing the call through socket implementation layers prior to being acted upon by a network interface card (NIC). Processing of the stream socket may be accelerated in a transparent manner and take advantage of high-speed network fabrics through solutions, such as native interception, sockets direct protocol, and shared memory communications over remote direct memory access (RDMA). Native interception utilizes the operating system without external support and utilizes NIC protocol offloading capabilities (e.g., parallel-stack full offload, TCP chimney partial offload, host bus adapter full offload, etc.). Sockets direct protocol (SDP) provide an RDMA-accelerated alternative to TCP protocol on IP (e.g., bypasses the operating system resident TCP stack for stream connection between endpoints on the RDMA fabric). Shared memory communications over RDMA enables direct, high-speed, low-latency, memory-to-memory (peer-to-peer) communications (e.g., enables TCP/IP stacks to switch from TCP network flows to more optimized direct memory access flows that use RDMA).

As recognized by embodiments of the present invention, while the aforementioned solutions provide various manners to accelerate processing, no one solution overcomes the challenges presented by; data transmission failures, user and kernel space protocol implementations, application and user transfer patterns, and sharing connections among application threads.

Figure 1:
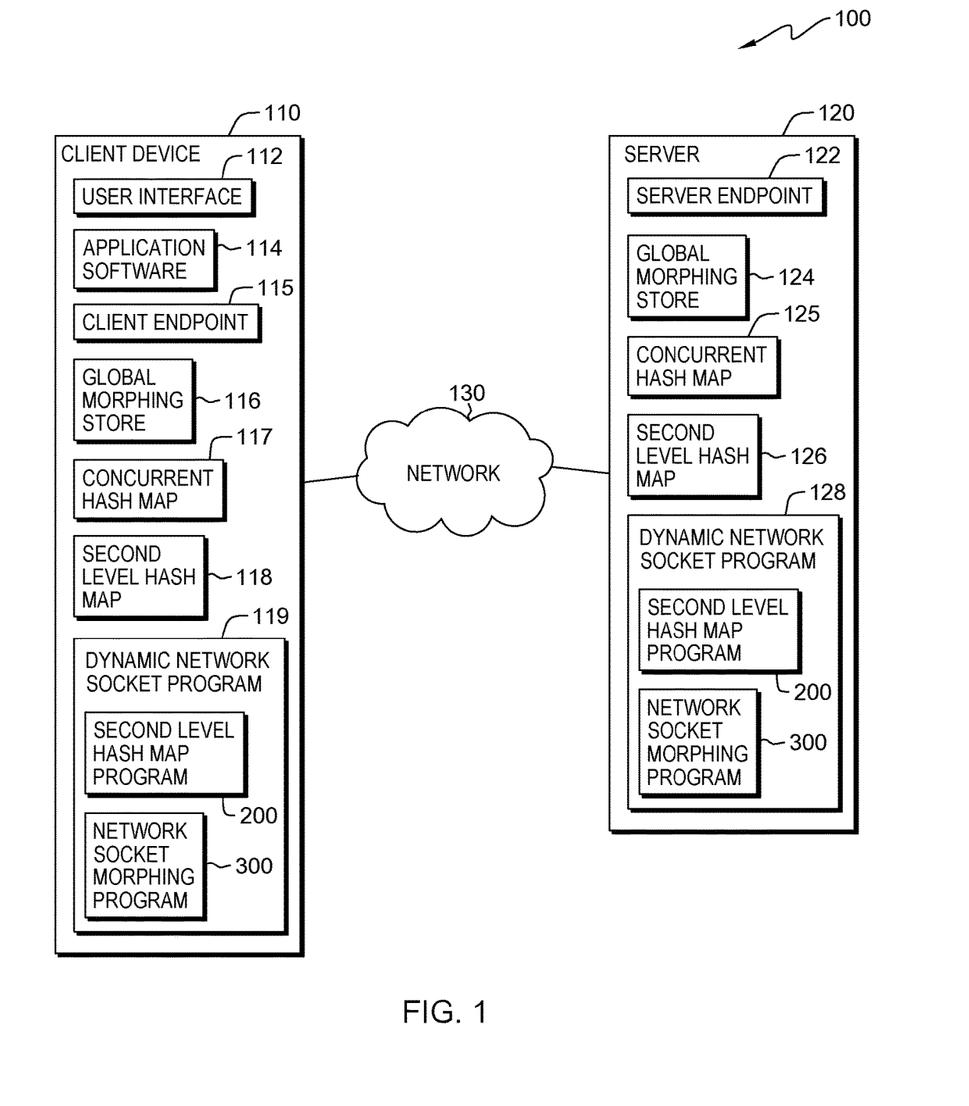
FIG. 1 is a functional block diagram illustrating a data network environment, in accordance with an embodiment of the present invention.

The present invention will now be described in detail with reference to the Figures. FIG. 1 is a functional block diagram illustrating a data network environment, generally designated 100, in accordance with one embodiment of the present invention. FIG. 1 provides only an illustration of one embodiment and does not imply any limitations with regard to the environments in which different embodiments may be implemented.

In the depicted embodiment, data network environment 100 includes client device 110 and server 120 interconnected over network 130. Data network environment 100 may include additional computing devices, mobile computing devices, servers, computers, storage devices, or other devices not shown.

Client device 110 may be a web server or any other electronic device or computing system capable of processing program instructions and receiving and sending data. In some embodiments, client device 110 may be a laptop computer, a tablet computer, a netbook computer, a personal computer (PC), a desktop computer, a personal digital assistant (PDA), a smart phone, or any programmable electronic device capable of communicating with network 130. In other embodiments, client device 110 may represent a server computing system utilizing multiple computers as a server system, such as in a cloud computing environment. In general, client device 110 is representative of any electronic device or combination of electronic devices capable of executing machine readable program instructions as described in greater detail with regard to FIG. 5, in accordance with embodiments of the present invention. Client device 110 contains user interface 112, application software 114, client endpoint 115, global morphing store 116, concurrent hash map 117, second level hash map 118, and dynamic network socket program 119.

User interface 112 is a program that provides an interface between a user of client device 110 and a plurality of applications that reside on client device 110 (e.g., application software 114) and/or may be accessed over network 130. A user interface, such as user interface 112, refers to the information (e.g., graphic, text, sound) that a program presents to a user and the control sequences the user employs to control the program. A variety of types of user interfaces exist. In one embodiment, user interface 112 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 112 sends and receives information through application software 114 to dynamic network socket program 119.

Application software 114 is a set of one of more programs designed to carry out the operations for a specific application to assist a user to perform an activity (e.g., word processing programs, spreadsheet programs, media players, web browsers, etc.). Application software 114 interacts with the socket application programming interface supplied by the operating system installed on client device 110 that then allows application software 114 to control and utilize network sockets. Functions within application software 114 pass and receive addresses via the application programming interface to and from the operating system. However, the operating system is responsible for transporting the messages (e.g., data) across network 130. In the depicted embodiment, application software 114 resides on client device 110. In another embodiment, application software 114 may reside on server 120 or on another device (not shown) connected over network 130.

Client endpoint 115 and server endpoint 122 are two separate endpoints that each define one of two channels that may be utilized to establish a two-way communication link between client device 110 and server 120, respectively. Endpoints are unique and include a local socket address and a transport protocol assigned by an application programming interface provided by the operating system of client device 110 and/or server 120 that may be accessed by application software, such as application software 114. Client endpoint 115 represents an assigned socket on client device 110. Server endpoint 122 represents an assigned socket on server 120. In the depicted embodiment, client endpoint 115 is the initiator (e.g., sends a connection request), and server endpoint 122 is the receiver (e.g., listens for a connection request). In another embodiment, client endpoint 115 may reside on server 120 and server endpoint 122 may reside on client device 110. While only client endpoint 115 and server endpoint 122 are shown in the depicted embodiment, additional endpoints may be reside on client device 110 and server 120 or on another device not shown.

Global morphing stores 116 and 124 are repositories of sourcing details that are set during run time initialization (located on client device 110 and server 120, respectively). Global morphing stores 116 and 124 include fields that are based upon reading in property values respective to client device 110 and server 120. Fields within global morphing stores 116 and 124 may include: a default protocol for pairing, a set of supported protocols other than the default, a dynamic initialization of a protocol, an ahead of time initialization of a protocol, a switching policy that identifies a user data transfer policy indicating when to change a transport protocol, a failover policy indicating a protocol to utilize when a data transfer failure occurs, and a security policy indicating which application threads should access second level hash map 118. In the depicted embodiment, global morphing store 116 resides on client device 110, and global morphing store 124 resides on server 120. In another embodiment, global morphing stores 116 and 124 may reside on other computing devices not shown that include dynamic network socket program 119. In another embodiment, global morphing stores 116 and 124 may reside on other computing devices not shown and may be downloaded upon request (e.g., user request, dynamic network socket program 119, etc.).

Concurrent hash map 117 and concurrent hash map 125 are top level hash maps (located on client device 110 and server 120, respectively). In general, a hash map is a data structure to implement an associative array, which is a structure that can map keys to values in order to improve the speed of data retrieval. Hash maps use hash functions to compute an index into an array of buckets or slots from which the correct value can be found. A concurrent hash map is a thread-safe collection intended to be used as a primary hash map implementation for a multi-thread and concurrent environment without external synchronization that only locks a portion of the hash map instead of the whole hash map. A thread safe collection refers to code which can be safely used or shared in a concurrent or multi-threading environment that behaves as expected. An application thread is placeholder information associated with a single use of application software 114 that includes the information to perform a service request. Application threads access concurrent hash maps 117 and 125 through socket descriptors. The socket descriptors are unique keys utilized for performing look ups within concurrent hash maps 117 and 125, which reference second level hash maps 118 and 126. In the depicted embodiment, concurrent hash maps 117 and 125 reside respectively on client device 110 and server 120.

Second level hash maps 118 and 126 are two level concurrent hash maps (e.g., nested hash map within another hash map) located respectively on client device 110 and server 120. Concurrent hash maps 117 and 125 reference second level hash maps 118 and 126 respectively as the value set for a key. Second level hash map 118 is the output of second level hash map program 200 respective to client device 110 (e.g., entries are based on global morphing store 116 and client device 110). Second level hash map 126 is the output of second level hash map program 200 respective to server 120 (e.g., entries are based on global morphing store 124 and server 120).

Dynamic network socket programs 119 and 128 (located on client device 110 and server 120, respectively) include second level hash map program 200 and network socket morphing program 300. Dynamic network socket programs 119 and 128 are the same program but are installed on different computing devices (i.e., client device 110 and server 120), and therefore may create different values respective to the computing device on which the program is installed. Second level hash map program 200, explained in greater detail in FIG. 2, creates the entries that result in second level hash maps 118 and 126 based on global morphing stores 116 and 124. Network socket morphing program 300, explained in great detail in FIG. 3, is responsible for switching the client endpoint 115 and server endpoint 122 during a data transfer based on conditions encountered, information within global morphing stores 116 and 124, second level hash maps 118 and 126.

Server 120 may be a management server, a web server, or any other electronic device or computing system capable of receiving and sending data. In some embodiments, server 120 may be a laptop computer, a tablet computer, a netbook computer, a personal computer (PC), a desktop computer, a personal digital assistant (PDA), a smart phone, or any programmable device capable of communication with client device 110 over network 130. In other embodiments, server 120 may represent a server computing system utilizing multiple computers as a server system, such as in a cloud computing environment. Server 120 contains server endpoint 122, global morphing store 124, concurrent hash map 125, second level hash map 126, and dynamic network socket program 128.

Network 130 may be a local area network (LAN), a wide area network (WAN), such as the Internet, a wireless local area network (WLAN), any combination thereof, or any combination of connections and protocols that will support communications between client device 110, server 120, and other computing devices and servers (not shown), in accordance with embodiments of the inventions. Network 130 may include wired, wireless, or fiber optic connections.

Figure 2:
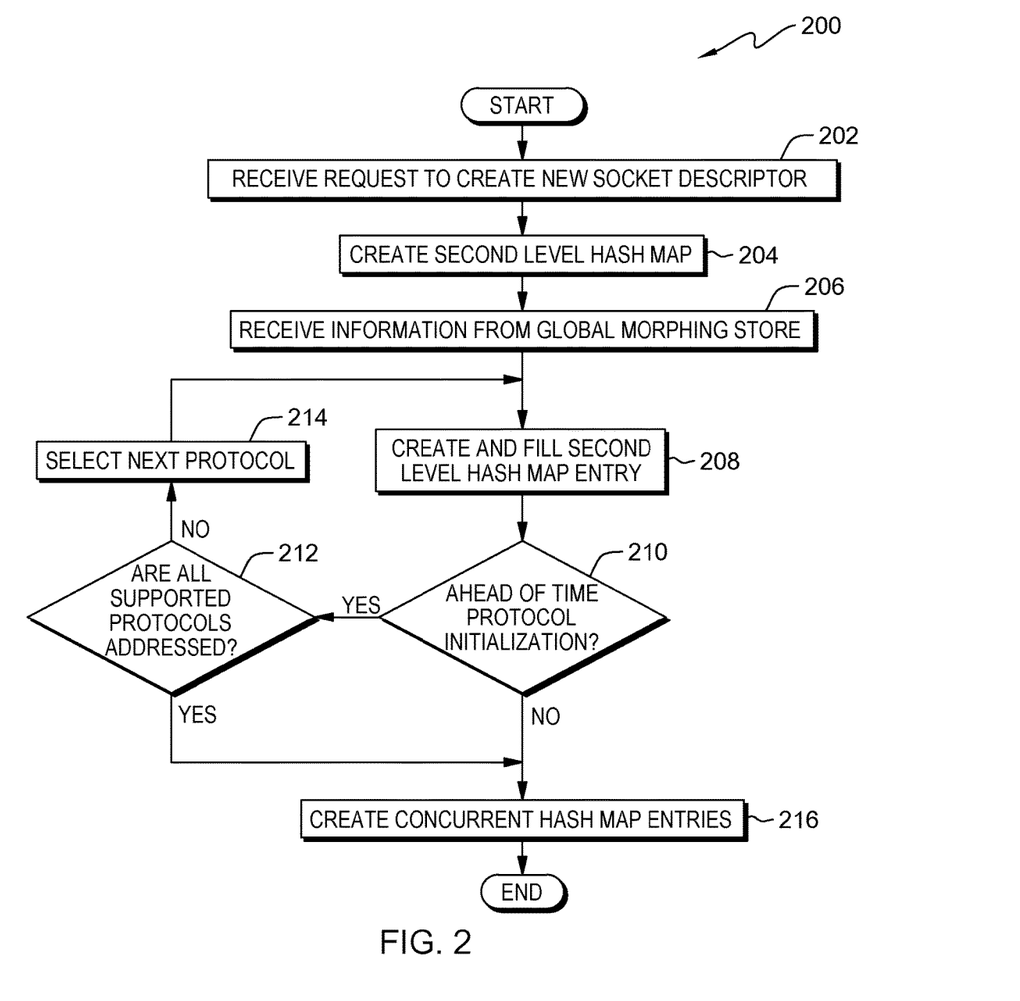
FIG. 2 is a flowchart depicting operational steps of a second level hash map program, on a client device and a server within the data network environment of FIG. 1, for creating second level entry values relevant to the connection states of available Internet Protocols, in accordance with an embodiment of the present invention.
Figure 3:
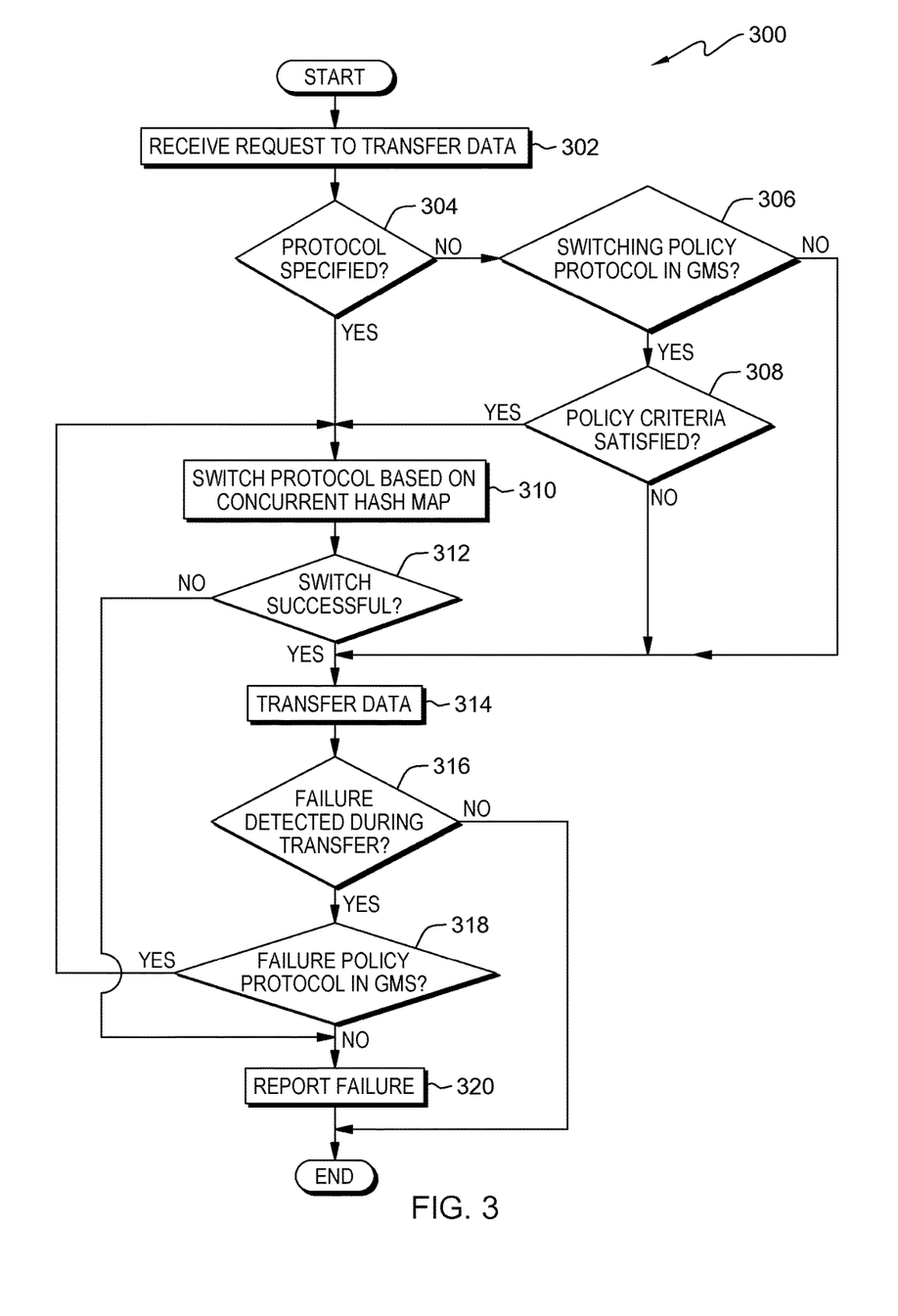
FIG. 3 is a flowchart depicting operational steps of a network socket morphing program on a client device and a server within the data network environment of FIG. 1 for switching endpoints during the course of communication establishment and/or data transfer among protocols supporting endpoint API abstractions for a specified network connection based on application settings and/or user policies, in accordance with an embodiment of the present invention.

FIG. 2 is a flowchart depicting operational steps of second level hash map program 200, a program for creating second level entry values relevant to the connection states of available Internet Protocols, in accordance with an embodiment of the present invention. Client device 110 and server 120 include configuration files that indicate which of the endpoints (e.g., Internet Protocol (IP) address and port combination) should be enabled with specific protocols between remote peers. The IP address is a numerical label assigned to each computing device participating in a computer network (e.g., network 130) that uses the Internet Protocol for communication (e.g., 32 bit address for Internet Protocol version 4, 128 bit address for Internet Protocol version 6). The IP address, therefore, serves the purpose of providing both host or network interface identification and location addressing for computing devices. The port is a software construct that serves as a communications endpoint within the operating system of a computing device (e.g., completes the destination or origination address of a communications session).

Prior to initiating, during runtime initialization, global morphing stores 116 and 124 may be initialized by reading in property variables from the configuration files (e.g., parses configuration files into fields) associated with dynamic network socket programs 119 and 128. Runtime initialization refers to the period during which a computer program is executing in which initial values assignment occurs. In one embodiment, the configuration files specify fields within global morphing stores 116 and 124 per each endpoint. In another embodiment, the configuration files specify fields within global morphing stores 116 and 124 per a group of endpoints or all of the endpoints created by application software 114.

In step 202, second level hash map program 200 receives a request to create a new socket descriptor. A socket descriptor is a unique string representing the name of a connection that may also be used as a placeholder to indicate the connection (e.g., abstract indicator used to access a file or other input/output, such as a network connection). On client device 110, second level hash map program 200 receives the request as an IP address and specified port from application software 114 in response to a user action through user interface 112 (e.g., identifies client endpoint 115). In the depicted embodiment, server 120 is the receiver and, through a passive open, binds to a port and enables the port for listening in order to open server 120 up for connection requests. Server 120 receives a request for a connection through the bound listening port from client device 110. In one embodiment, upon receipt of the connection request, server 120 binds a new socket to the same local port and sets the remote endpoint to the address of the port of client device 110 and thereby establishes a connection (e.g., client endpoint 115 to server endpoint 122). In another embodiment, upon receipt of the connection request, server 120 binds a new socket to a different port and sets the remote endpoint to the address of the port of client device 110 and thereby establishes a connection. Second level hash map program 200 assigns a unique socket descriptor within concurrent hash maps 117 and 125. The creation of the new socket descriptor within concurrent hash maps 117 and 125 initiates the creation of second level hash map 118 and second level hash map 126.

In step 204, second level hash map program 200 creates a second level hash map (e.g., second level hash map 118 and/or second level hash map 126). Second level hash map program 200 creates an object that may be a variable, a data structure, a function, or may be a class where the object may be a combination of variables, functions, and data structures that result in second level hash maps 118 and 126. In one embodiment, when endpoints do not share attributes (e.g., a security policy within the configuration file did not indicate sharing), second level hash map program 200 creates a new second level hash map 118 and/or a new second level hash map 126. In another embodiment, when a group of endpoints share attributes, second level hash map program 200 appends an existing second level hash map 118 and/or appends an existing second level hash map 126 (e.g., adding new connections to existing connections as identified within the security policy of the configuration file). Second level hash map program 200 creates second level hash maps 118 and/or 126 with fields for inclusions of a protocol type and a connection state for each entry that may be filled upon creation and for future use by concurrent hash map 117 and/or concurrent hash map 125. For example, second level hash map 118 nests within concurrent hash map 117 as the value set for the unique key (e.g., concurrent hash map 117 references second level hash map 118).

In step 206, second level hash map program 200 receives information from global morphing store 116 and/or global morphing store 124. Second level hash map program 200 receives socket information pertaining to the default protocol, supported protocols, ahead of time or dynamic protocol initialization, data transfer policy, failover policy, and security policy. For example, second level hash map program 200 receives a default protocol for the pairing of TCP/IP with a set of supported protocols of session description protocol (SDP) and shared memory communications-remote direct memory access (SMC-R). In addition, second level hash map program 200 may receive a switching policy identifying a user data transfer policy indicating when the runtime should change the transport protocol, the failure policy indicating the protocol to utilize should a data transfer failure occur, and a security policy indicating which application threads may access second level hash maps 118 and/or 126 in order to source an available socket descriptor. The security policy enables second level hash map program 200 to share established socket descriptors between active threads (e.g., a connection pool) that are subjected to application software 114, the user, and the security policy settings within global morphing store 116 and/or global morphing store 124. Therefore, the connection pool is implicitly provisioned with indirection and failover capabilities that allow the middleware to utilize second level hash map 118 and/or second level hash map 126 without additional effort.

In step 208, second level hash map program 200 creates and fills a second level hash map entry. Second level hash map program 200 creates at least one default entry within second level hash map 118 and/or second level hash map 126 based on the default protocol at the time of set-up. Second level hash map program 200 creates an endpoint based on the default protocol and updates the default entry with actual information. Upon creation of the endpoint, second level hash map program 200 updates the entry within second level hash map 118 and/or second level hash map 126 with the protocol and connection state. For example, the default protocol is TCP/IP, and the connection state refers to the operational bindings, such as create, close, connect, bind accept, read, and write.

In another embodiment, second level hash map program 200 may create additional entries within second level hash map 118 and/or second level hash map 126 based upon the supported protocol as identified within global morphing stores 116 and/or 124, respectively, when ahead of time protocol initialization is set. Second level hash map program 200 creates a new entry within second level hash map 118 (e.g., maintains the default protocol entry and appends a new entry) and/or second level hash map 126. Second level hash map program 200 creates an endpoint based on the supported protocol and fills second level hash map 118 and/or second level hash map 126 upon completion of the entry for the supported protocol. Second level hash map program 200 continues to create entries within second level hash map 118 and/or second level hash map 126 until second level hash map program 200 addresses each supported protocol identified in global morphing store 116 and global morphing store 124. For example, global morphing store 116 includes supported protocols of SDP and SMC-R; therefore, second level hash map 118 will include entries for TCP/IP, SDP, and SMC-R at completion.

In decision 210, second level hash map program 200 determines whether ahead of time protocol initiation is set. Second level hash map program 200 checks the information received from global morphing store 116 and/or global morphing store 124 to determine whether ahead of time protocol initialization or dynamic protocol initialization is set. Ahead of time protocol initialization refers to performing initialization prior to second level hash map program 200 receiving a request. Dynamic protocol initialization occurs as second level hash map program 200 receives requests (e.g., does not create second level hash map 118). If second level hash map program 200 determines ahead of time protocol initialization is set (decision 210, yes branch), then second level hash map program 200 determines whether all supported protocols are addressed (decision 212). If second level hash map program 200 determines ahead of time protocol initialization is not set, i.e., dynamic protocol initialization is set instead (decision 210, no branch), then second level hash map program 200 creates a concurrent hash map entry (step 216).

In decision 212, second level hash map program 200 determines whether all the supported protocols are addressed. Second level hash map program 200 checks the information received from global morphing store 116 and/or global morphing store 124 to determine whether global morphing store 116 and/or global morphing store 124 include supported protocols that are in addition to the default protocol. For example, the default protocol is TCP/IP, and the additional supported protocols are SDP and SMC-R. Second level hash map program 200 compares the supported protocols with the protocols currently stored in the entries of second level hash map 118. If second level hash map program 200 determines that second level hash map 118 and/or second level hash map 126 include all the supported protocols (decision 212, yes branch), then second level hash map program 200 creates a concurrent hash map entry (step 216). If second level hash map program 200 determines that second level hash map 118 and second level hash map 126 do not include all of the supported protocols (decision 212, no branch), then second level hash map program 200 selects the next protocol (step 214).

In step 214, second level hash map program 200 selects the next protocol from the supported protocols provided by global morphing store 116 and/or global morphing store 124. For example, second level hash map program 200 creates the second level hash map entries for TCP/IP. Second level hash map program 200 determines ahead of time initialization is set and that global morphing store 116 and/or global morphing store 124 includes additional supported protocols of SDP and SMC-R. Second level hash map program 200 may determine that entries for SDP are not included in second level hash map 118. Therefore, second level hash map program 200 selects SDP as the next protocol and returns to create a second level hash map entry (step 210) for SDP.

In step 216, second level hash map program 200 fills the concurrent hash map entries. Second level hash map program 200 replaces the value set within concurrent hash map 117 and concurrent hash map 125 with corresponding information from second level hash map 118 and second level hash map 126, respectively. The unique key of concurrent hash map 117 references second level hash map 118, and concurrent hash map 125 references second level hash map 126, which may be utilized by network socket morphing program 300 in response to receipt of a request to transfer data. Once second level hash map program 200 completes, second level hash map program 200 completes the updates to concurrent hash map 117 and concurrent hash map 125, which then include references to second level hash map 118 and second level hash map 126, respectively.

FIG. 3 is a flowchart depicting operational steps of network socket morphing program 300, a program for switching the endpoints during the course of communications establishment and/or data transfer among protocols supporting endpoint API abstractions for a specified network connection based on application settings and/or user policies, in accordance with an embodiment of the present invention.

In step 302, network socket morphing program 300 receives a request to transfer data. For example, a user of client device 110, utilizing application software 114 through user interface 112, opens a web browser and enters a web site address of transferdata.com. Once the user finishes entering the address and selects enter, go, arrow symbol, etc., through user interface 112, network socket morphing program 300 receives a request to transfer data.

In decision 304, network socket morphing program 300 determines whether a protocol is specified. In one embodiment, network socket morphing program 300 receives a specific network protocol associated with the request to transfer data (e.g., connection request identifies a single network protocol for utilization). In another embodiment, network socket morphing program 300 may receive network protocols based upon an order defined within the operational software installed on client device 110 (e.g., multiple network protocols are available for utilization). If network socket morphing program 300 determines the protocol is specified (decision 304, yes branch), then network socket morphing program 300 switches the protocol based on concurrent hash map 117 (step 310). If network socket morphing program 300 determines the protocol is not specified (decision 304, no branch), then network socket morphing program 300 determines whether a switching policy is identified within global morphing store 116 (decision 306).

In decision 306, network socket morphing program 300 determines whether a switching policy is identified within global morphing store 116. Network socket morphing program 300 accesses the field associated with the switching policy and retrieves the value of the field from global morphing store 116 (e.g., global morphing store 124). The switching policy may indicate network protocols that network socket morphing program 300 can utilize based upon various criteria (e.g., size of file being transferred, data connection rates, bursting network pattern with average load and occasional data peaks, reduced turnaround time, etc.) through a user data transfer policy indicating when the runtime should change the transport protocol. The switching policy may also identify adaptive application level data transfer patterns to pass data with multiple attributes in one transfer between client endpoint 115 and server endpoint 122. For example, when a large amount of data is to be sent over a connection through distributed applications, data transfer objects, if identified in the switching policy, network socket morphing program 300 may encapsulate the data within a data transfer object to reduce the amount of data to be sent. If network socket morphing program 300 determines the switching policy is identified (decision 306, yes branch), then network socket morphing program 300 determines whether the switching policy criteria is satisfied (decision 308). If network socket morphing program 300 determines the switching policy is not identified (decision 306, no branch), then network socket morphing program 300 transfers data (step 314).

In decision 308, network socket morphing program 300 determines whether the switching policy criteria is satisfied. If network socket morphing program 300 determines the switching policy criteria is satisfied (decision 308, yes branch), then network socket morphing program 300 switches the protocol based on the concurrent hash map 117 (step 310). If network socket morphing program 300 determines the switching policy criteria is not satisfied (decision 308, no branch), then network socket morphing program 300 transfers the data (step 314).

In step 310, network socket morphing program 300 switches the protocol based on concurrent hash map 117 when an existing working connection is available. In one embodiment, network socket morphing program 300 utilizes the protocol specified within the request and searches the supported protocols within second level hash map 118 for a matching entry. In another embodiment, network socket morphing program 300 utilizes the protocol identified within the switching policy stored within global morphing store 116 and searches the supported protocols within second level hash map 118 for a matching entry. For example, an application thread references client endpoint 115. Network socket morphing program 300 utilizes the socket descriptor for client endpoint 115 as the key within concurrent hash map 117. Based on the key, network socket morphing program 300 locates second level hash map 118 as the value set of concurrent hash map 117. Network socket morphing program 300 dynamically switches the protocol by changing the active state from one entry within second level hash map 118 to another (e.g., current active entry is closed and replaced by another entry that is then made active).

Similarly on server 120 when the server establishes a connection, network socket morphing program 300 identifies the server thread which references server endpoint 122. Network socket morphing program 300 utilizes the socket descriptor for server endpoint 122 as the key to locate an entry within concurrent hash map 125 which then references an entry within second level hash map 126. Based on the key, network socket morphing program 300 locates second level hash map 126 as the value set of concurrent hash map 125. Network socket morphing program 300 may utilize another supported protocol and/or connection state from within second level hash map 126 based on the key to then switch the protocols.

Figure 4A:
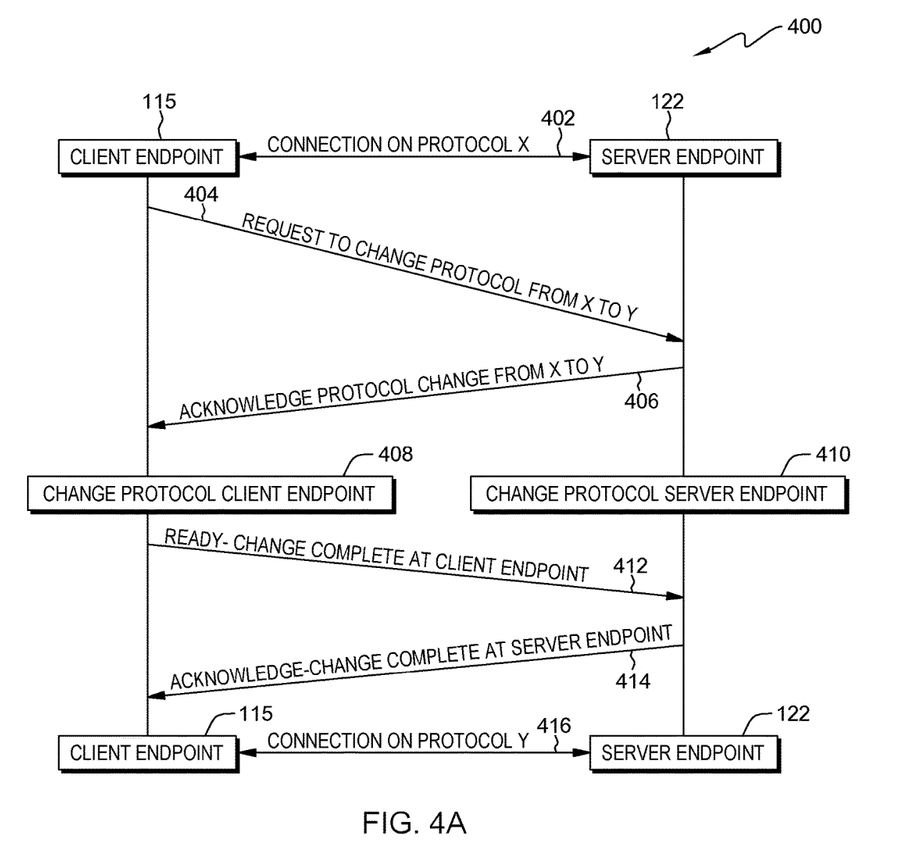
FIG. 4A depicts an example of the process the network socket morphing program utilizes to switch an established connection over a network protocol between a client and server to another network protocol, in accordance with an embodiment of the present invention.

For example, FIG. 4A, process for switching established connection 400, depicts the switching of a protocol between client 110 and server 120. Initially, in step 402, network socket morphing program 300 establishes a connection on protocol X from client endpoint 115 to server endpoint 122 (step 402). Network socket morphing program 300 determines the existing protocol is to be switched (steps 304-308 identifying a requested protocol or a policy identified protocol). In step 404, network socket morphing program 300 sends a request from client endpoint 115 to server endpoint 122 to request to change protocol X to protocol Y. In step 406, network socket morphing program 300 on server 120 receives the request made to server endpoint 122 and sends an acknowledgement of the protocol change from X to Y back to client endpoint 115. In step 408, network socket morphing program 300 on client device 110 switches client endpoint 115 to the protocol Y, and in step 410, network socket morphing program 300 on server 120, switches server endpoint 122 to protocol Y.

In some other embodiments, network socket morphing program 300 may switch from a kernel space protocol to a user space protocol (e.g., may also switch from the user space protocol to the kernel space protocol). Kernel space protocols refer to protocols implemented within a protected area of memory (e.g., TCP/IP, SDP, SMC-R). User space protocols refer to protocols implemented in system memory (e.g., sockets over RDMA). Network socket morphing program 300 switches between the kernel and user space protocols through the abstractions of the application interface identified within second level hash map 118. Provided the supported protocols subscribe to the abstractions and a method to invoke the abstractions exists, switches may be made between the kernel space and the user space level seamlessly. For example, the application interface for TCP/IP is a primarily kernel space protocol that includes abstractions to create, close, connect, bind, accept, read, and write. Provided the supported user space protocol also includes the same abstractions, a seamless switch may occur from the kernel space to the user space.

Figure 4B:
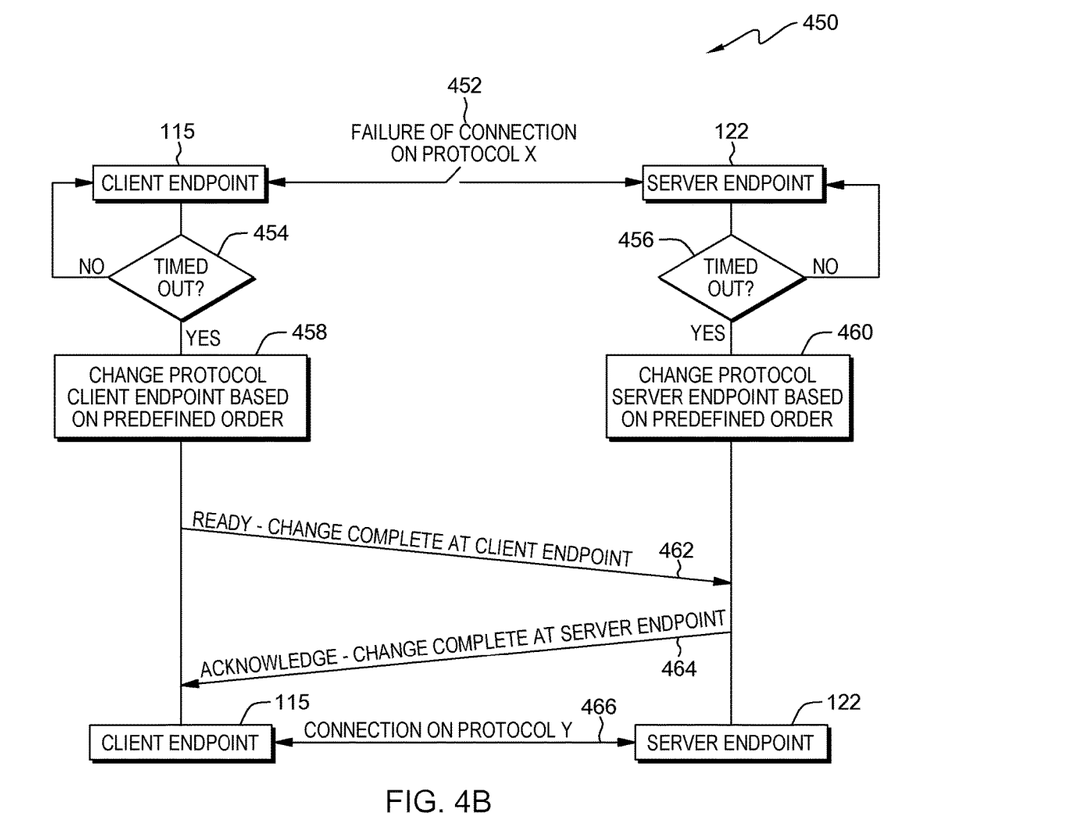
FIG. 4B depicts an example of the process that a network socket morphing program utilizes to re-establish a connection between a client and server in the event of a failure of the connection, in accordance with an embodiment of the present invention.

In some other embodiment, network socket morphing program 300 switches the protocol based on the protocol identified within the failure policy stored within global morphing store 116 and global morphing store 124. For a connection failure, global morphing store 116 and global morphing store 124 may include the same predefined order for protocol switching to implement in order to prevent client endpoint 115 and server endpoint 122 from switching to different protocols that would inhibit establishing a connection. For example, as depicted in FIG. 4B, process for re-establishing failed connection 450 after incurring a failure of connection X and subsequent timeout, network socket morphing program 300 on client device 110 and server 120 implements a failure policy from global morphing stores 116 and 124, respectively. In step 458, network socket morphing program 300 changes the protocol of client endpoint 115 based on a predefined order noted in the failure policy. Network socket morphing program 300 accesses concurrent hash map 117 that references second level hash map 118. Network socket morphing program 300 then selects the protocol and connection state from second level hash map 118 based on the failure policy and switches the protocol for client endpoint 115. Similarly, in step 460, network socket morphing program 300 changes the protocol for server endpoint 122 based on a predefined order noted in the failure policy and ultimately assigns the same protocol to server endpoint 122.

In decision 312, network socket morphing program 300 determines whether the protocol switch is successful. Continuing the example depicted in FIG. 4A for switching based on the switching policy and/or a specified protocol request, in step 412, network socket morphing program 300, through client endpoint 115, sends a ready message identifying the protocol change to protocol y is complete for client endpoint 115 to server endpoint 122. In step 414, network socket morphing program 300 on server 120 sends an acknowledgement from server endpoint 122 to client endpoint 115 and identifies that the protocol change to protocol y is complete on server 120. Upon completion, in step 416, network socket morphing program 300 may utilize the established connection on protocol y between client endpoint 115 and server endpoint 122 to transfer data.

Continuing the example of FIG. 4B for a failure condition, in step 462, network socket morphing program 300, through client endpoint 115, sends a ready message identifying the protocol change to protocol y is complete for client endpoint 115 to server endpoint 122. In step 464, network socket morphing program 300 on server 120 sends an acknowledgement from server endpoint 122 to client endpoint 115 and identifies that the protocol change to protocol y is complete on server 120. Upon completion, in step 466, network socket morphing program 300 may utilize the established connection on protocol y between client endpoint 115 and server endpoint 122 to transfer data.

If network socket morphing program 300 determines the protocol switch is successful (decision 312, yes branch), then network socket morphing program 300 transfers data (step 314). If network socket morphing program 300 determines the protocol switch was not successful (decision 312, no branch), then network socket morphing program 300 reports a failure (step 320).

In step 314, network socket morphing program 300 transfers data between client endpoint 115 and server endpoint 122. In one embodiment, network socket morphing program 300 utilizes a TCP/IP Protocol connection and transfers data from client endpoint 115 to server endpoint 122 as streams of data utilizing a sequence number and packets (e.g., piece of a message that includes server endpoint 122). In another embodiment, network socket morphing program 300 utilizes a sockets direct protocol and transfers data to transparently accelerated endpoints, such as client endpoint 115 and server endpoint 122. In some other embodiment, network socket morphing program 300 utilizes a shared memory communication over RDMA for transferring accelerated data between client endpoint 115 and server endpoint 122. In RDMA, data may be transmitted from memory without extensive buffering and without a call to an operating system kernel. In some other embodiment, network socket morphing program 300 may utilize a user space implementation to transfer data between client endpoint 115 and server endpoint 122. In another embodiment, network socket morphing 300 may encapsulate data within a data transfer object and transfer the data.

In decision 316, network socket morphing program 300 determines whether a failure was detected during the transfer of data between client endpoint 115 and server endpoint 122. For example, in FIG. 4B, in step 452, network socket morphing program 300 detects a failure on the connection on protocol x between client endpoint 115 and server endpoint 122. In one embodiment, network socket morphing program 300 may determine packets are missing from the data transmission. In another embodiment, network socket morphing program 300 determines a connection timeout. For example, in decisions 454 and 456, network socket morphing program 300 determines whether the connection between client endpoint 115 and server endpoint 122 encounters a timeout. A server connection timeout means that a server is taking too long to reply to a data request made from another device. Timeouts are not a reply message but rather an assessment made by client device 110 or server 120 that a reply is not received, and a request is not fulfilled in a predetermined length of time. Timeout errors may occur due to failures and/or errors of the server (e.g., server 120), the requesting device (e.g., client device 110), network hardware, and/or an Internet connection. If network socket morphing program 300 determines the connection timed out (decisions 454 and 456, yes branches), then network socket morphing program 300 changes the protocol for client endpoint 115 based on the predefined order (step 458) and changes the protocol for server endpoint 122 based on the predefined order (step 460). If network socket morphing program 300 determines the connection has not timed out (decisions 454 and 456, no branches), then network socket manager program 300 continues to attempt to establish a connection on protocol x, thus checking for a failure of the connection on protocol x (step 452). In some other embodiment (not depicted), network socket morphing program 300 may determine the network protocol switch was not successful (e.g., connection was unable to be established between client endpoint 115 and server endpoint 122).

If network socket morphing program 300 determines a failure was detected during the transfer of data between client endpoint 115 and server endpoint 122 (decision 316, yes branch), then network socket morphing program 300 determines whether a failure policy protocol is included in global morphing store 116 or global morphing store 124. If network socket morphing program 300 determines a failure was not detected during the transfer of data between client endpoint 115 and server endpoint 122 (decision 316, no branch), then network socket morphing program 300 completes.

In decision 318, network socket morphing program 300 determines whether a failure policy protocol is included in global morphing store 116 or global morphing store 124. Network socket morphing program 300 may determine global morphing stores 116 and 124 include a failure policy that identifies a network protocol to utilize in the event of a failure. In one embodiment, the failure policy may include a default failure policy that identifies a predefined order of network protocols to utilize in the event of a failure. In another embodiment, the failure policy may include user preferences (e.g., specify a preferred order in the event of a failure). If network socket morphing program 300 determines a failure policy protocol is included in global morphing store 116 or global morphing store 124 (decision 318, yes branch), then network socket morphing program 300 switches the protocol based on concurrent hash map 117 (step 310). If network socket morphing program 300 determines a failure policy protocol is not included in global morphing store 116 or global morphing store 124 (decision 318, no branch) then network socket morphing program 300 reports a failure (step 320).

In step 320, network socket morphing program 300 reports a failure. In one embodiment, network socket morphing program 300 may display a general error message to the user through user interface 112. In another embodiment, network socket morphing program 300 may display an error message detailing the cause of the failure.

Figure 5:
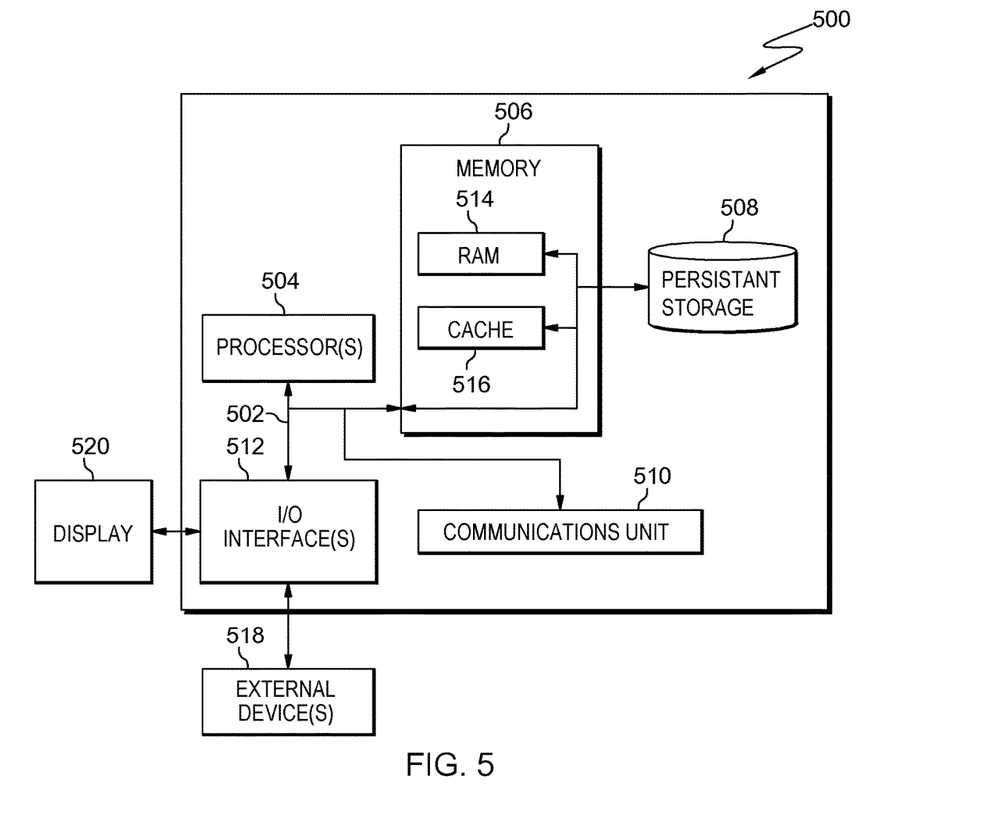
FIG. 5 is a block diagram of components of the data network environment executing the dynamic network socket program, in accordance with an embodiment of the present invention.

FIG. 5 depicts a block diagram of components of data network environment 500, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Data network environment 500 includes processor(s) 504, cache 516, memory 506, persistent storage 508, communications unit 510, input/output (I/O) interface(s) 512, and communications fabric 502. Communications fabric 502 provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM) 514. In general, memory 506 can include any suitable volatile or non-volatile computer readable storage media. Cache 516 is a fast memory that enhances the performance of processor(s) 504 by holding recently accessed data, and data near recently accessed data, from memory 506.

Program instructions and data used to practice embodiments of the present invention may be stored in persistent storage 508 and in memory 506 for execution by one or more of the respective processor(s) 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 408 through communications unit 510.

I/O interface(s) 512 allows for input and output of data with other devices that may be connected to each computer system. For example, I/O interface(s) 512 may provide a connection to external device(s) 518, such as a keyboard, a keypad, a touch screen, and/or some other suitable input device. External device(s) 518 can also include portable computer readable storage media, such as, for example, thumb drives, portable optical or magnetic disks, and memory cards. Software and data used to practice embodiments of the present invention, e.g., user interface 112, application software 114, client endpoint 115, server endpoint 122, global morphing stores 116 and 124, concurrent hash maps 117 and 125, second level hash maps 118 and 126, dynamic network socket programs 119 and 128, second level hash map program 200, and network socket morphing program 300, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing network sockets, the method comprising:
   receiving, by one or more computer processors, a request to create a network socket to transfer data;
   identifying, by the one or more computer processors, information associated with the received request, including one or more of: a default network protocol, one or more supported network protocols, ahead of time initialization, a data transfer policy, a failure policy, and a security policy;
   creating, by the one or more computer processors, a second level hash map based on the identified information, wherein the second level hash map includes the supported network socket protocols and a connection state;
   creating, by the one or more computer processors, a first entry within the second level hash map;
   filling, by the one or more computer processor, the first entry within the second level hash map with the first supported protocol and available connection states;
   determining, by the one or more computer processors, whether ahead of time initialization is enabled;
   responsive to determining ahead of time initialization is enabled, determining, by the one or more computer processors, whether all supported protocols from the identified one or more supported protocols are included within the second level hash map;
   responsive to determining all supported protocols from the identified one or more supported protocols are included within the second level hash map, updating, by the one or more computer processors, a concurrent hash map, wherein the concurrent hash map includes one or more socket descriptors and one or more associated references to the second level hash map;
   determining, by the one or more computer processors, a network protocol to utilize associated with the received request based on the updated concurrent hash map; and
   establishing, by the one or more computer processors, a connection for the network socket over the determined network protocol.

2. The method of claim 1, further comprising:
   transferring, by the one or more computer processors, data utilizing the established connection over the determined network protocol;
   determining, by the one or more computer processors, whether a failure occurs while transferring data;
   responsive to determining a failure occurs while transferring data, determining, by the one or more computer processors, whether a failure policy is set;
   responsive to determining the failure policy is set, selecting, by the one or more computer processors, a second network protocol to utilize based on the created second level hash map; and
   establishing, by the one or more computer processors, a connection for the network socket over the selected second network protocol.

3. The method of claim 1, further comprising:
   responsive to determining that all supported protocols from the identified one or more supported protocols are not included within the second level hash map, selecting by the one or more computer processors, a second supported protocol from the one or more identified supported protocols that is not included in the second level hash map;
   creating, by the one or more computer processors, a second entry within the second level hash map; and
   filling, by the one or more computer processors, the second entry within the second level hash map with the second supported protocol and available connection states.

4. The method of claim 1, wherein determining the network protocol to utilize associated with the received request further comprises:
   determining, by the one or more computer processors, whether a network protocol is specified in the received request;
   responsive to determining the network protocol is not specified, determining, by the one or more computer processors, whether a switching policy is set; wherein the switching policy includes criteria specifying when to change the network protocol including one or more of: a user data transfer policy, adaptive application level transfer patterns, and a second network protocol to switch to;
   responsive to determining the switching policy is set, determining, by the one or more computer processors, to change the network protocol based on switching; and
   switching, by the one or more computer processors, the network protocol based on the second level hash map.

5. The method of claim 1, wherein the security policy allows application threads to share socket descriptors.

6. The method of claim 1, further comprising:
   receiving by the one or more computer processors, an application thread that references a socket descriptor, wherein the application thread includes the information to perform a service request;
   accessing, by the one or more computer processors, a concurrent hash map based on the referenced socket descriptor;
   accessing, by the one or more computer processors, the second level hash map based on the referenced socket descriptor within the accessed concurrent hash map; and
   switching, by the one or more computer processors, to a supported protocol and connection state within the accessed second level hash map to complete the service request.

7. A computer program product for managing network sockets, the computer program product comprising:
   one or more computer readable storage devices having program instructions therewith, the program instructions executable by a computer to cause the computer to:
   receive a request to create a network socket to transfer data;

to identify information associated with the received request, including one or more of: a default network protocol, one or more supported network protocols, ahead of time initialization, a data transfer policy, a failure policy, and a security policy;

create a second level hash map based on the identified information, wherein the second level hash map includes the supported network socket protocols and a connection state;

create a first entry within the second level hash map;

fill the first entry within the second level hash map with the first supported protocol and available connection states;

determine whether ahead of time initialization is enabled;

responsive to determining ahead of time initialization is enabled, determine whether all supported protocols from the identified one or more supported protocols are included within the second level hash map;

responsive to determining all supported protocols from the identified one or more supported protocols are included within the second level hash map, update a concurrent hash map, wherein the concurrent hash map includes one or more socket descriptors and one or more associated references to the second level hash map;

determine a network protocol to utilize associated with the received request based on the updated concurrent hash map; and establish a connection for the network socket over the determined network protocol.

8. The computer program product of claim 7, further comprising program instructions, stored on the one or more computer readable storage devices, to:

transfer data utilizing the established connection over the determined network protocol;

determine whether a failure occurs while transferring data;

responsive to determining a failure occurs while transferring data, determine whether a failure policy is set;

responsive to determining the failure policy is set, select a second network protocol to utilize based on the created second level hash map; and establish a connection for the network socket over the selected second network protocol.

9. The computer program product of claim 7, further comprising program instructions, stored on the one or more computer readable storage devices, to:

responsive to determining that all supported protocols from the identified one or more supported protocols are not included within the second level hash map, select a second supported protocol from the one or more identified supported protocols that is not included in the second level hash map;

create a second entry within the second level hash map; and fill the second entry within the second level hash map with the second supported protocol and available connection states.

10. The computer program product of claim 7, wherein determining the network protocol to utilize associated with the received request further comprises program instructions, stored on the one or more computer readable storage devices, to:

determine whether a network protocol is specified in the received request;

responsive to determining the network protocol is not specified, determine whether a switching policy is set;

wherein the switching policy includes criteria specifying when to change the network protocol including one or more of: a user data transfer policy, adaptive application level transfer patterns, and a second network protocol to switch to;

responsive to determining the switching policy is set, determine by one or more computer processors, to change the network protocol based on switching; and switch the network protocol based on the second level hash map.

11. The computer program product of claim 7, wherein the security policy allows application threads to share socket descriptors.

12. The computer program product of claim 7, further comprising program instructions, stored on the one or more computer readable storage devices, to:

receive an application thread that references a socket descriptor, wherein the application thread includes the information to perform a service request;

access a concurrent hash map based on the referenced socket descriptor;

access the second level hash map based on the referenced socket descriptor within the accessed concurrent hash map; and switch to a supported protocol and connection state within the accessed second level hash map to complete the service request.

13. A computer system for managing network sockets, the computer system comprising:

one or more computer processors, one or more computer readable storage devices, and program instructions stored on the computer readable storage devices for execution by at least one of the one or more processors, the program instructions comprising:

program instructions to receive a request to create a network socket to transfer data;

program instructions to identify information associated with the received request, including one or more of: a default network protocol, one or more supported network protocols, ahead of time initialization, a data transfer policy, a failure policy, and a security policy;

program instructions to create a second level hash map based on the identified information, wherein the second level hash map includes the supported network socket protocols and a connection state;

program instructions to create a first entry within the second level hash map;

program instructions to fill the first entry within the second level hash map with the first supported protocol and available connection states;

program instructions to determine whether ahead of time initialization is enabled;

responsive to determining ahead of time initialization is enabled, determine whether all supported protocols from the identified one or more supported protocols are included within the second level hash map;

responsive to determining all supported protocols from the identified one or more supported protocols are included within the second level hash map, program instructions to update a concurrent hash map, wherein the concurrent hash map includes one or more socket descriptors and one or more associated references to the second level hash map;

program instructions to determine a network protocol to utilize associated with the received request based on the updated concurrent hash map; and program instructions to establish a connection for the network socket over the determined network protocol.

14. The computer system of claim 13, further comprising program instructions, stored on the one or more computer readable storage devices, to:
    transfer data utilizing the established connection over the determined network protocol;
    determine whether a failure occurs while transferring data;
    responsive to determining a failure occurs while transferring data, determine whether a failure policy is set;
    responsive to determining the failure policy is set, select a second network protocol to utilize based on the created second level hash map; and
    establish a connection for the network socket over the selected second network protocol.

15. The computer system of claim 13, further comprising program instructions, stored on the one or more computer readable storage devices, to:
    responsive to determining that all supported protocols from the identified one or more supported protocols are not included within the second level hash map, select a second supported protocol from the one or more identified supported protocols that is not included in the second level hash map;
    create a second entry within the second level hash map; and
    fill the second entry within the second level hash map with the second supported protocol and available connection states.

16. The computer system of claim 13, wherein determining the network protocol to utilize associated with the received request further comprises program instructions, stored on the one or more computer readable storage devices, to:
    determine whether a network protocol is specified in the received request;
    responsive to determining the network protocol is not specified, determine whether a switching policy is set; wherein the switching policy includes criteria specifying when to change the network protocol including one or more of: a user data transfer policy, adaptive application level transfer patterns, and a second network protocol to switch to;
    responsive to determining the switching policy is set, determine by one or more computer processors, to change the network protocol based on switching; and
    switch the network protocol based on the second level hash map.

17. The computer program system of claim 13, further comprising program instructions, stored on the one or more computer readable storage devices, to:
    receive an application thread that references a socket descriptor, wherein the application thread includes the information to perform a service request;
    access a concurrent hash map based on the referenced socket descriptor;
    access the second level hash map based on the referenced socket descriptor within the accessed concurrent hash map; and
    switch to a supported protocol and connection state within the accessed second level hash map to complete the service request.

* * * * *